United States Patent [19]

Trittipoe

[11] 4,167,274

[45] Sep. 11, 1979

[54] SCRAPER PULL-HOOK ASSEMBLY

[75] Inventor: Jack H. Trittipoe, Elwood, Ill.

[73] Assignee: Caterpillar Tractor Co., Peoria, Ill.

[21] Appl. No.: 804,421

[22] Filed: Jun. 7, 1977

[51] Int. Cl.² ............................................. B60D 1/04
[52] U.S. Cl. .................................. 280/481; 280/477;
280/515; 293/117
[58] Field of Search ............... 280/481, 477, 504, 762,
280/515, 480; 293/64, 65, 67, 69 R, DIG. 1;
37/126 R, 129, DIG. 12; 403/324, 154, 316,
318; 85/5 CP, 5 R, 5 N; 151/54

[56] References Cited

U.S. PATENT DOCUMENTS

| | | | |
|---|---|---|---|
| 2,023,079 | 12/1935 | Jandus et al. | 293/67 |
| 2,703,244 | 3/1955 | Nearing | 280/504 |
| 2,788,999 | 4/1957 | Fryer et al. | 280/481 |
| 3,493,026 | 2/1970 | Donofrio et al. | 151/54 |
| 3,606,388 | 9/1971 | Campbell | 280/477 |
| 3,740,080 | 6/1973 | Kuhl | 280/481 |
| 3,906,613 | 9/1975 | Chappell | 280/481 |
| 4,018,452 | 4/1977 | Wagatsuma | 280/481 |

Primary Examiner—John A. Pekar
Attorney, Agent, or Firm—Wegner, Stellman, McCord, Wiles & Wood

[57] ABSTRACT

A hitch assembly for a vehicle having a rearwardly extended frame adapted to be contacted by a trailing vehicle and including brackets mounted on the frame operative when the vehicle is being pushed to provide a stop against overriding of the trailing vehicle relative to the frame. A connector member is removably associated with the frame and has releasable connection to the brackets thereon for converting the frame to a towing mode.

12 Claims, 6 Drawing Figures

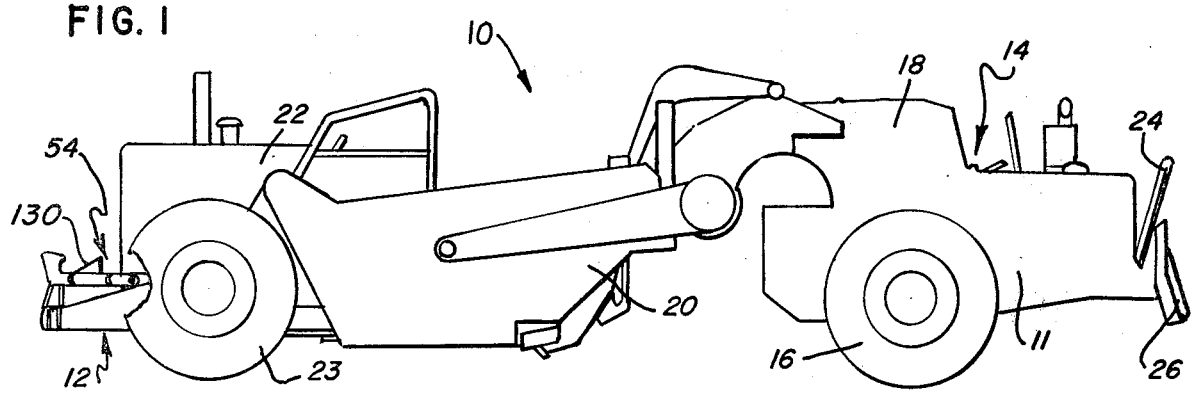
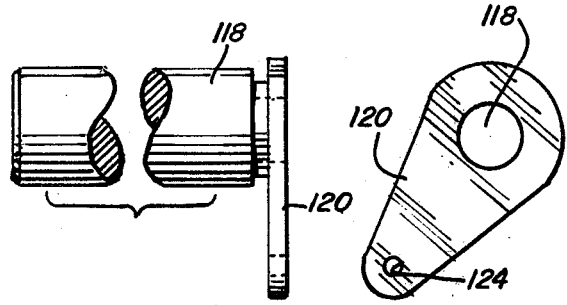
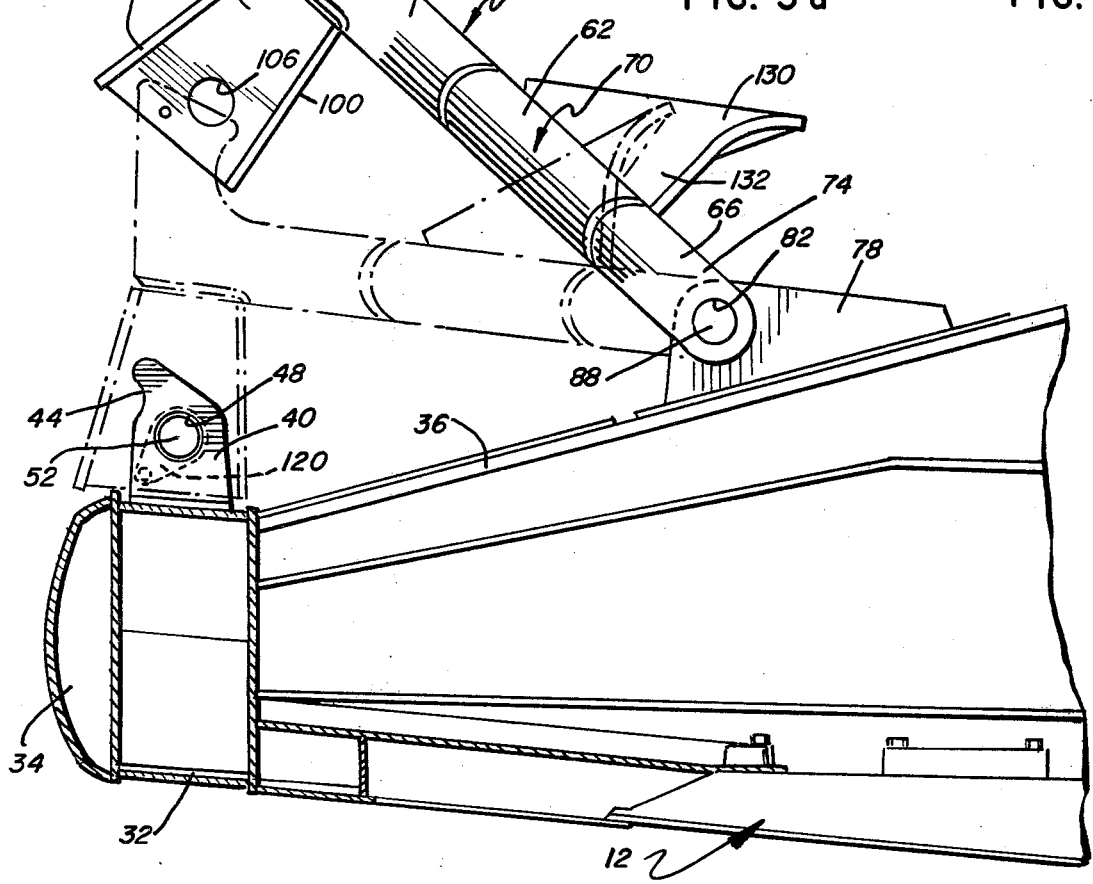

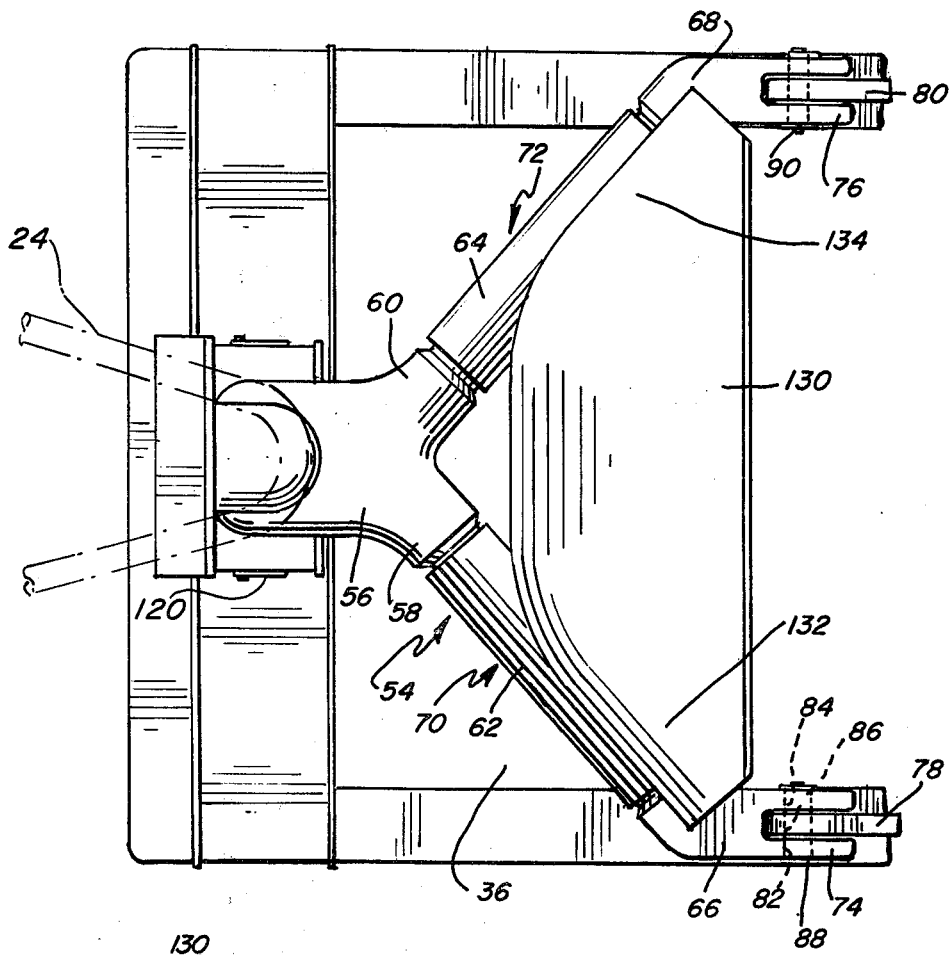
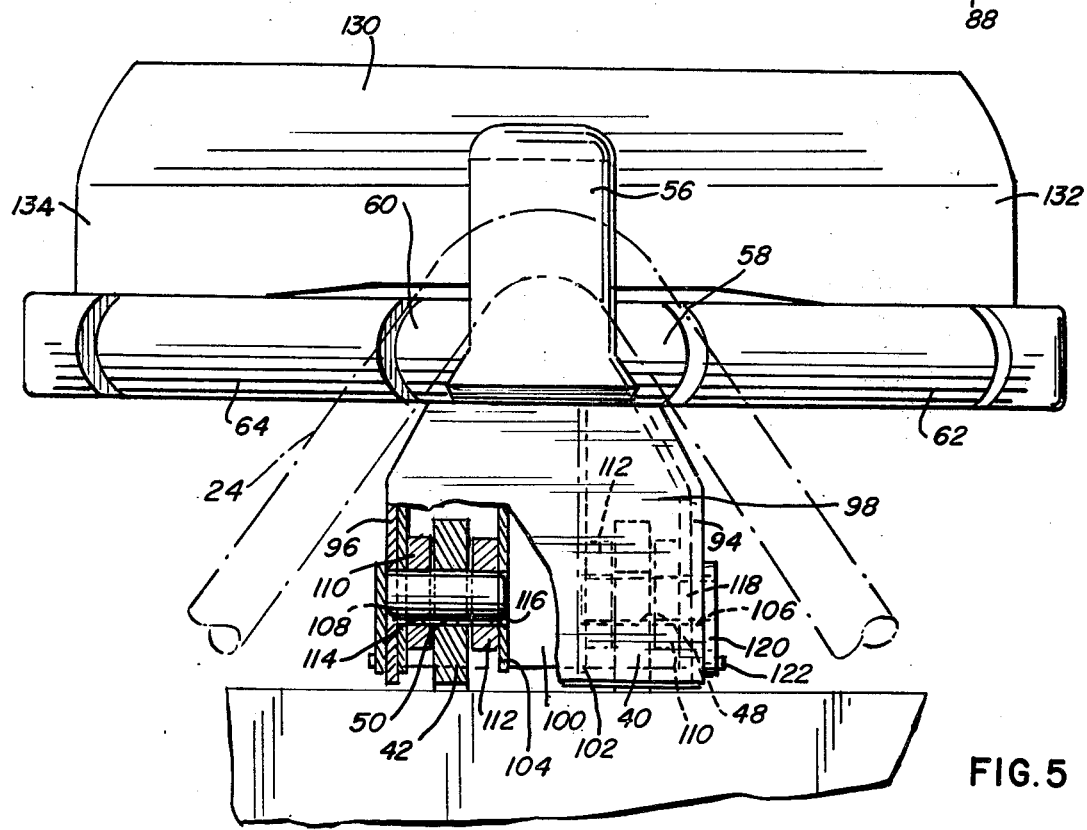

SCRAPER PULL-HOOK ASSEMBLY

BACKGROUND OF THE INVENTION

1. Field of the Invention

This invention relates to tractor scrapers, and more particularly to the hitch assembly on the push frame.

2. DESCRIPTION OF THE PRIOR ART

Heretofore, on push-pull scrapers, a pull-hook was mounted on the push frame portion of the scraper such that the bale nosepiece on the forward end of a following scraper, or the like, would engage over the pull hook so that the following scraper could be pulled by means of the bale nosepiece connection. Alternatively, the following scraper may also act as a pusher by using the push block on the front of the following scraper to engage with the push block which extends beyond the hook so as to allow unimpeded contact by the pusher. The mounting portion of the hook is rested on the top surface of the push frame and is either bolted or welded thereto with the legs of the hook being pinned to lugs carried by a forward portion of the push frame. When the scraper is used without the hook, there is no provision for preventing the blade of a tractor from riding up over the push block of the push frame, which blade could come in contact with components of the engine causing damage thereto. The hook, likewise, contained no guards or shields to prevent the bale nosepiece from riding forward of the hooked portion of the hook and inadvertently engage with the radiator and/or like parts of the engine carried by the push frame. The current construction provided no means for connecting the scraper to a following piece of equipment, except by use of the bale nosepiece and hook.

SUMMARY OF THE INVENTION

The present invention is directed to overcoming one or more of the problems set forth above. According to the present invention, upstanding brackets are carried by the top surface of the push frame, which brackets have aligned apertures therethrough and have rearwardly curved upper portions which are adapted to engage with and contain a bulldozer blade so as to prevent the blade from doing damage to engine components on the push frame. A pull-hook or hitch assembly has on one end portion a hook and a mounting member which mounting member is connected to the brackets by means of fasteners. The hitch assembly has a pair of spaced apart, diverging legs pivotally secured to lugs carried by the sloping top surface of the push frame. The hook provides a positive engaging member for receiving the bale nosepiece of a following scraper so that the bale is securely connected thereto while the scraper is pulling a following scraper.

The pull-hook or hitch assembly of the present invention provides for inserting a pin through the apertures in the upstanding brackets, which pin can serve as a pull pin whereby a cable is connected to the pin for pulling equipment behind the scraper. With the pull-hook or hitch assembly fastened to the push frame by means of the pins through the brackets and by means of the pins through the ends of the diverging legs, an apparatus is provided which can be engaged by the bale nosepiece of the following scraper, or the like.

BRIEF DESCRIPTION OF THE DRAWINGS

The details of construction and operation of the invention are more fully described with reference to the accompanying drawings which form a part hereof and in which like reference numerals refer to like parts throughout.

In the drawings:

FIG. 1 is an elevational view showing the outlines of a tractor scraper having a push frame upon which is mounted an improved hitch assembly;

FIG. 2 is an enlarged elevational view of a portion of the push frame with the hitch assembly, shown in solid lines, partially attached to the push frame and, as shown in dashed lines, in assembled relation with the push frame;

FIG. 3A is an elevational view of a teardrop-type pivot pin;

FIG. 3B is a front view of the pivot pin of FIG. 3A;

FIG. 4 is a plan view of the hitch assembly in position on the push frame; and

FIG. 5 is a front elevational view of the hitch assembly in position on the push frame with parts of the mounting portion of the hitch assembly broken away and shown in section.

DESCRIPTION OF THE PREFERRED EMBODIMENT

Referring to the drawings wherein like reference numerals refer to like parts throughout, FIG. 1 illustrates a push-pull tractor scraper vehicle 10, the vehicle being shown in phantom with the exception of the push frame 12. The tractor scraper 10 has a front unit 11 with a source of power or engine 14 for driving a pair of front wheels 16 and is connected through a gooseneck connection 18 to a scraper bowl 20 and the push frame 12. A second source of power or engine 22 is mounted on the push frame 12 for driving a second pair of wheels 23. A bale nosepiece 24 and cushioned push block 26 is mounted on the front end of the front unit 11.

As shown in FIG. 2, the push frame 12 has a transversely disposed push block 32 extending across the frame with a bumper pad 34, or the like, projecting rearwardly from the block 32. The pad 34 is adapted to be contacted by either a push block on the front of a following scraper or by a bulldozer blade of a tractor. The push frame 12 has a sloping top surface 36 extending upwardly and forwardly from the block 32. A pair of laterally spaced, vertically upstanding brackets 40, 42 project upwardly from and are secured to the block 32, as by welding, or the like. Each bracket 40, 42 has a rearwardly curved upper portion 44 and 46 and has an aperture 48 and 50 in said bracket, which apertures 48, 50 are aligned with each other along an axis lying perpendicular to the longitudinal axis of the vehicle. The rearwardly curved upper portions 44,46 serve to contain the bottom edge of a bulldozer blade to prevent the blade from jumping over the block 32 and brackets 40,42 and contacting component parts of the engine 22. The brackets 40,42 can serve as pull brackets when a pin 52 (FIG. 2) is passed through the aligned apertures 48,50 so as to bridge the space between the brackets 40,42. A cable or hook, or other attaching means, can be engaged with the pin 52 between the brackets 40,42 so that the scraper can pull whatever is connected to the cable.

A hitch assembly 54 is removably attached to the brackets 40,42 and to spaced points on the push frame 12. Specifically, the hitch assembly 54 is comprised of a hook-shaped member 56 which is cast, forged, machined, or the like, and has a pair of outwardly extending stubs 58,60 integrally formed therewith. A tubular sleeve 62 is telescoped over and is secured to stub 58 with sleeve 64 telescoped over and secured to stub 60. The sleeves 62,64 diverge outwardly so that the outer ends are spaced apart and receive angled terminal members 66,68 so as to form the legs 70,72 of the hitch assembly 54. The terminal members 66,68 each have angularly disposed connecting portions 74,76 which, when the terminal members 66,68 are connected to the sleeves 62,64, the connecting portions 74,76 will lie parallel to each other. Each connecting portion 74,76 is bifurcated so as to span upstanding lugs 78,80 welded, or otherwise permanently secured, to the sloping top surface 36 of the push frame 12. Aligned apertures 82, 84 are formed through the bifurcated connecting portions 74,76 with an aperture 86 formed through the lugs 78,80 such that with each bifurcated portion 74 and 76 assembled over the appropriate lug 78,80, the apertures 82,84,86 will be aligned so that pins 88,90 can be inserted therein to pivotally mount the legs 70,72 of the hitch assembly 54 to the push frame 12.

On the end of the hitch assembly 54, containing the hook member 56, is fastened a downwardly depending mounting member 92 which has a hollow box-like shape made up of two side walls 94,96 having portions lying substantially parallel to each other and to the axis of the vehicle. A front wall 98 and rear wall 100 join the side walls 94,96 with a pair of partitions 102,104 extending between the front and rear walls and lying parallel to the parallel portions of the side walls 94,96. Aligned apertures 106,108 are formed through the side walls 94,96 and through the partitions 102,104. Bearing blocks 110,112 are secured to the inner surfaces of the side walls 94 and 96 and to the partitions 102,104 with the apertures 114,116 in the bearing blocks 110,112 being aligned with the apertures 106,108 in the side walls 94,96 and in the partitions 102,104. The facing surfaces of the bearing blocks 110,112 are spaced apart a distance sufficient to receive the brackets 40,42. Teardrop-type pins 118, such as shown in FIGS. 3A and 3B, are assembled inwardly from the side walls 94,96 of the mounting member 92 so that the ends of the pins 118 clear the partitions 102,104 inside the housing. The pins 118 pass through the apertures 106,108 in the walls 94,96 through the apertures 114,116 in the bearing blocks 110,112 and through the apertures 48,50 in the brackets 40,42. The latch plate 120 of the teardrop pin 118 extends downwardly from the pin and has a bolt 122 passing through a small aperture 124 in the outer end portion of the latch plate 120, which bolt is threaded into the side wall 94 or 96 of the mounting member 92 so as to lock the pin 118 in position with respect to the mounting member 92. Two teardrop-type pins 118 are used to assemble the hitch assembly 54 to the spaced apart mounting brackets 40,42 with one pin 118 extending in from each of the side walls 94,96. With the pins 118 in place, the hitch assembly 54 is secured to the push frame 12, ready for use.

The hook 56 has a rearwardly and downwardly sloping top surface 126 terminating in a curved portion 128 which forms the hooking surface for the hitch assembly 54. The bale nosepiece 24 to a following scraper is adapted to be pivoted forward and around the hook 56 on the hitch assembly 54 whereupon, when the vehicle is moved forward, the hook 56 will engage the bale nosepiece 24 thereby pulling the following scraper therewith. The bale nosepiece 24 is shown in phantom in place on the hook in FIGS. 4 and 5. It should be noticed that a guard or shield 130 is provided on the hitch assembly 54 with the legs 132,134 of the guard or shield 130 being attached to the sleeves 62,64 of the legs 70,72 of the hitch assembly 54. The shield 130 slopes upwardly from the top surfaces of the hitch assembly 54 so that, for instance, the bale nosepiece 24 of a following scraper would be deflected up the guard 130 in the event the front tractor and rear tractor became too close to each other. The guard 130 also serves to protect the air intake to the rear engine 22 of the scraper.

There has been shown and described an improved pulling arrangement for a scraper, or the like, whereby spaced apart, upwardly extending brackets 40,42 are mounted on the push frame 12, which brackets 40,42 have rearwardly curved upper portions 44 for engaging and containing forward movement of a blade of a tractor, or the like. A pin 52 can be extended between said brackets 40,42 whereby a cable or hook can be connected to the pin 52 for pulling purposes. This is particularly usefull for pulling vehicles that have broken down or became stuck, or the like. The hitch assembly 54 can be pivotally mounted to the sloping portion of the push frame 12 with the mounting member 92 of the hitch assembly 54 engaging over the spaced brackets 40,42 so that pins passing through the opposite walls 94,96 of the mounting member 92 engage in the apertures 48,50 of the spaced brackets 40,42 to secure the one end of the hitch assembly 54 to the brackets 40,42. The diverging legs 70,72 of the assembly have the bifurcated ends pinned to the lugs 78,80 of the push frame 12 for securing the other end of the hitch assembly to the push frame. With both ends of the hitch assembly 54 secured in place, it is possible to use the hook 56 to engage with a bale on a following scraper, or the like, to pull a following vehicle, whether it be a scraper, or the like, during loading, scraping, leveling, or the like.

The embodiment of the invention in which an exclusive property or privilege is claimed is defined as follows:

1. A hitch assembly, for a vehicle having a rearwardly extended frame adapted to be contacted by a trailing vehicle, comprising;
   bracket means mounted on the frame and including a pair of upstanding laterally spaced brackets having upper ends providing rearwardly curved hook portions operative when the vehicle is being pushed to provide a stop against overriding of the trailing vehicle relative to the frame;
   and connector means removably associated with the frame and having releasable connection to said bracket means for converting the frame to a towing mode.

2. A hitch assembly of claim 1 in which said laterally spaced brackets have aligned bores therethrough,
   and said connector means comprises an elongated pin mounted in said bores of the brackets.

3. A hitch assembly, for a vehicle having a rearwardly extended frame adapted to be contacted by a trailing vehicle, comprising;
   bracket means mounted on the frame and including a pair of upstanding laterally spaced brackets having upper ends providing rearwardly curved hook portions operative when the vehicle is being pushed to provide a stop against overriding of the trailing vehicle relative to the frame;
   and connector means removably associated with the frame and having releasable connection to said bracket means for converting the frame to a towing mode, said connector means comprising a lower connector portion and an upper forwardly curved hook portion releasably connected to said brackets.

4. In a tractor scraper having a push frame and a hitch assembly carried by said push frame, in combination, a pair of spaced apart, upstanding brackets carried by said push frame, a hitch having one end portion with an upper side and a lower side, said hitch having a forwardly facing hook on said upper side and a mounting member on said lower side, said mounting member having side walls lying parallel to said bracket, means detachably securing said side walls to said brackets, said hitch having a pair of legs diverging outwardly from said one end portion, means for pivotally securing said legs to said push frame at points spaced from said upstanding brackets whereby a bale on a following vehicle can engage with said hook 5. In a tractor scraper having a push frame and a hitch assembly carried by said push frame, in combination, a pair of spaced apart, upstanding brackets carried by said push frame, a hitch having one end portion with an upper side and a lower side, said hitch having a forwardly facing hook on said upper side and a mounting member on said lower side, said mounting member being detachably secured to said brackets, said hitch having a pair of legs diverging outwardly from said one end portion, means for pivotally securing said legs to said push frame at points spaced from said upstanding brackets whereby a bale on a following vehicle can engage with said hook, said push frame having a top surface, said upstanding brackets are mounted on said top surface of said push frame and have rearwardly curved upper portions for preventing a bulldozer blade from riding up the top of said push frame.

6. In a tractor scraper having a push frame and a hitch assembly carried by said push frame, in combination, a pair of spaced apart, upstanding brackets carried by said push frame, a hitch having one end portion with an upper side and a lower side, said hitch having a forwardly facing hook on said upper side and a mounting member on said lower side, said mounting member having side walls detachably secured to said brackets, said hitch having a pair of legs diverging outwardly from said one end portion, means for pivotally securing said legs to said push frame at points spaced from said upstanding brackets whereby a bale on a following vehicle can engage with said hook, said detachable securement between said mounting member and said brackets comprises aligned apertures in said side walls of said mounting member, aligned apertures formed in said brackets, said mounting member fitting over said brackets with said apertures in the side walls of the mounting member aligning with said apertures in said brackets, and fastening means passing through said apertures for securing said hitch assembly to said push frame.

7. In a tractor scraper as claimed in claim 6 wherein said fastening means is a pin having a transversely disposed plate rigidly attached thereto, said plate being secured to one of the side walls of said mounting member for holding the pin seated in said apertures.

8. In a tractor scraper having a push frame and a hitch assembly carried by said push frame, in combination, a pair of spaced apart, upstanding brackets carried by said push frame, a hitch having one end portion with an upper side and a lower side, said hitch having a forwardly facing hook on said upper side and a mounting member on said lower side, said mounting member being detachably secured to said brackets, said hitch having a pair of legs diverging outwardly from said one end portion, means for pivotally securing said legs to said push frame at points spaced from said upstanding brackets whereby a bale on a following vehicle can engage with said hook, said mounting member comprises a housing having a front wall, a rear wall and a pair of parallel side walls, said housing being secured to the lower side of said hitch, a pair of partitions inside said housing extending from the front wall to the rear wall and lying parallel to the side walls of said housing, aligned apertures formed through the side walls and partitions and being aligned with apertures in the spaced brackets when said housing seats over said brackets, and a fastening means entering from each side of the housing and passing through one bracket and one partition whereby the hitch is secured to said push frame.

9. In a tractor scraper having a push frame, a sloping top surface on said push frame, a pair of spaced apart, upstanding brackets carried by said push frame, aligned apertures formed through said spaced brackets, a rearwardly curved upper portion on each of said brackets for preventing bulldozer blades from riding up onto the sloping top surface of the push frame, and a pin seated in said apertures in said brackets to bridge between said brackets whereby a cable for pulling other objects can be attached to said pin.

10. A tractor scraper having a push frame, a sloping top surface on said push frame, a pair of spaced apart, upstanding brackets carried by said push frame, a rearwardly curved upper portion on each of said brackets for preventing a bulldozer blade from riding up the sloping top surface of the push frame, a hitch assembly having one end portion with an upper side and a lower side, said hitch assembly having a forwardly open hook carried by the upper side thereof, and a downwardly disposed mounting member on said lower side, said mounting member being detachably secured to said brackets, said hitch assembly having a pair of legs diverging outwardly from said one end portion, means for pivotally securing said legs to the sloping top surface of said push frame whereby a bale on a following vehicle can engage with said hook.

11. In a tractor scraper having a push frame, a sloping top surface on said push frame, a pair of spaced apart, upstanding brackets carried by said push frame and having horizontally aligned apertures therein, a rearwardly curved upper portion on each of said brackets for preventing a bulldozer blade from riding up the sloping top surface of the push frame, a hitch having a hook on one end portion with a mounting member downwardly disposed from said hook, said mounting member being operatively attached to said brackets by means of pins passing through said mounting member and through said apertures in said brackets, said hitch having a pair of legs diverging from said one end portion, means for pivotally securing said legs to the sloping top surface of said push frame whereby a bale on a following vehicle can engage with said hook.

12. In a tractor scraper as claimed in claim 11 wherein said means for pivotally securing said legs to said top surface comprises, bifurcated ends formed on said legs, spaced apart lugs fastened to said sloping top surface, each bifurcated end spanning one of said lugs, and a pin passing through each bifurcated end and through one of said lugs for securing said legs to said top surface.

* * * * *